US005974666A

United States Patent [19]

Tanaka et al.

[11] Patent Number: 5,974,666

[45] Date of Patent: Nov. 2, 1999

[54] PROCESS FOR PREPARING A CHARGING DEVICE

[75] Inventors: Eiko Tanaka; Hiroyuki Kataoka; Hiroshi Takayama, all of Ebina, Japan

[73] Assignee: Fuji Xerox Co., Ltd., Tokyo, Japan

[21] Appl. No.: 09/049,933

[22] Filed: Mar. 30, 1998

Related U.S. Application Data

[62] Division of application No. 08/805,147, Feb. 24, 1997, Pat. No. 5,822,658.

[30] Foreign Application Priority Data

Oct. 27, 1997 [JP] Japan .................................... 8-41503

[51] Int. Cl.$^6$ .................................................... B23P 15/00

[52] U.S. Cl. ...................................... 29/895.32; 29/895.3

[58] Field of Search ............................ 29/895.32, 895.3; 264/104, 105, 131; 399/174, 176, 115; 361/225; 430/902; 492/18

[56] References Cited

U.S. PATENT DOCUMENTS

| | | |
|---|---|---|
| 5,089,851 | 2/1992 | Tanaka et al. . |
| 5,235,386 | 8/1993 | Yano et al. . |
| 5,321,889 | 6/1994 | Watanabe et al. ..................... 29/895.3 |
| 5,711,072 | 1/1998 | Nakamura ............................ 29/895.32 |
| 5,823,929 | 10/1998 | Kavolius et al. .................... 29/895.32 |

FOREIGN PATENT DOCUMENTS

| | | |
|---|---|---|
| 4-303861 | 10/1992 | Japan . |
| 7-28301 | 1/1995 | Japan . |
| 7-77859 | 3/1995 | Japan . |

*Primary Examiner*—I. Cuda
*Attorney, Agent, or Firm*—Oliff & Berridge, PLC

[57] ABSTRACT

A charging device which is pressed against a surface of a body to be charged in a state that a voltage is applied to charge the body, having: an electrically conductive support to which a voltage is applied; an electrically conductive elastic body layer fixed on the electrically conductive support for dispersing electrically conductive particles to regulate resistance and hardness; an electrode layer provided on the electrically conductive elastic body layer, and having an electrically conductive inorganic material; and a resistance regulation layer provided on the electrode layer for regulating resistance.

7 Claims, 4 Drawing Sheets

PROCESS FOR PREPARING A CHARGING DEVICE

This is a Division of Application Ser. No. 08/805,147 filed Feb. 24. 1997 now U.S. Pat. No. 5,822,658. The entire disclosure of the prior application(s) is hereby incorporated by reference herein in its entirety.

BACKGROUND OF THE INVENTION

The present invention relates to a charging device in an image forming apparatus such as an electrophotographic apparatus, an electrostatic recording apparatus, or the like, in an electrophotographic copying machine, a printer, a facsimile, composite OA appliances thereof, etc. More particularly, the present invention relates to a charging device which is pressed against a surface of a body to be charged such as a light-sensitive body, a dielectric body, or the like, to thereby charge the surface of the body to be charged uniformly.

In an image forming apparatus such as an electrophotographic apparatus, an electrostatic recording apparatus, or the like, such an operation is to charge a surface of a body to be charged such as a light-sensitive body, a dielectric body, or the like. As a charging means, there is generally used a contactless charging system in which charging is performed by corona discharge which is generated by application of a high voltage to a tungsten wire. In such a contactless charging system, however, a large amount of ozone or nitrogen oxide ($NO_x$) is generated to bring about environmental pollution in the periphery of the image forming apparatus. Further, there arises a problem that the surface of the light-sensitive body is denatured by a corona product to cause deterioration of the light-sensitive body or image fogging and that pollution of wire has an influence on image quality to cause white spotting or black streaking in image.

On the contrary to the aforementioned contactless charging system, there is a contact charging system in which charging is performed by bringing a charging device into contact with a body to be charged. The contact charging system has an advantage that the voltage to be applied to the charging device is low so that the quantity of generated ozone becomes very low.

Also the contact type charging device, however, has a lot of problems, and various proposals have been made. For example, there is known an electrically conductive roll which has a base layer formed from an electronic electric conduction type elastic body material having a specific volume resistance adjusted to a value not larger than $10^3$ Ωcm, and an electrode layer formed from a synthetic resin material adjusted to a value of about $10^2$ Ωcm. Because the specific volume resistance of the base layer and the specific volume resistance of the electrode layer are both small, abnormal electric discharge is caused easily by uneven dispersion of the electrically conductive agent. Further, because the resistance against leaking depends on a dielectric layer formed on the electrode layer and having a film thickness of about 160 μm, the electrically conductive roll has a problem that leaking occurs easily.

As a measure, the Unexamined Japanese Patent Application Publication No. Hei 7-77859 has proposed an electrically conductive roll in which a base layer formed from an ionic electric conduction type elastic body having a specific volume resistance of from $10^6$ Ωcm to $10^9$ Ωcm, an electrode layer formed from an electronic electric conduction type synthetic resin having a specific volume resistance not larger than $10^3$ Ωcm, a resistance regulation layer and a protective layer are provided successively on the outer circumferential surface of a shaft body. Further, the Unexamined Japanese Patent Application Publication No. Hei 7-28301 has proposed an electrically conductive roll in which the aforementioned base layer formed from a foamed elastic body, an electronic electric conduction type auxiliary layer having a specific volume resistance not larger than $10^4$ Ωcm and a thin protective layer are provided successively on the outer circumferential surface of a shaft body. In these electrically conductive rolls, it is said that the abnormal discharge voltage is improved effectively to prevent the occurrence of leaking because the dispersion of the voltage distribution is attained at the time of application of the voltage by the base layer of medium resistance.

In the electrically conductive rolls disclosed in the aforementioned publications, the base layer is, however, formed from an elastic body material containing a small amount of ionic electric conduction agent, so that charging characteristic varies widely correspondingly to the environmental change because the electrically conductive roll highly depends on environment. Further, because the electrode layer is formed by mixing an electronic electric conduction agent in a synthetic resin in the same manner as in the conventional electrically conductive roll, local uneven dispersion of the electric conduction agent cannot be avoided. Accordingly, there arises a problem that not only leaking is still apt to be caused by the generation of abnormal electric discharge but also density irregularity occurs in a halftone image portion.

Further, in any one of the conventional contact type charging devices, toner and its outer additive, paper dust, etc. are deposited on a surface of the charging device through a body to be charged (light-sensitive body) when the charging device is used for a long time. There arises also a problem that the contact surface of the charging device is contaminated gradually by the deposition of toner, etc. so that the resistance value of the charging device is increased partially to thereby bring about lowering of charging characteristic.

As a measure, for example, the Unexamined Japanese Patent Application Publication No. Hei 4-303861 has proposed a charging device in which a stratiform solid lubricant such as graphite, or the like, is contained in a surface layer to make toner, etc. be hardly deposited on the surface of the charging device. In the charging device, the solid lubricant having a large particle size of 100 μm is, however, present in the surface layer. Accordingly, there arises a problem that unevenness of resistance is brought -so that image quality failures caused by bias leakage and image density irregularity occur.

SUMMARY OF THE INVENTION

Therefore, an object of the present invention is to solve the aforementioned problems, that is, to provide a process for preparing a charging device in which there is no occurrence of leaking based on uneven electric resistance of an electrically conductive elastic body layer and in which a good-quality image can be obtained in such a level that image density irregularity in a halftone image portion can be ignored in practical use.

Another object of the present invention is to provide a process for preparing a charging device in which toner, etc. from a surface of a body to be charged is made to be hardly deposited on the charging device so that lowering of charging characteristic caused by the close adhesion of toner is avoided to make durability excellent.

The inventors of the present application have made researches and discussions earnestly and continuously in order to obtain a good image free from image density irregularity, or the like caused by unevenness of electric resistance of the charging device. As a result, it has been found that the concentration of currents caused by uneven dispersion of electrically conductive particles in the elastic body layer can be dispersed by the electrode layer disposed between the electrically conductive elastic body layer and the resistance regulation layer and, accordingly, the occurrence of leaking and the occurrence of density irregularity in a halftone image portion can be avoided when the electrode layer is formed from only an electrically conductive material from which a binder resin having high resistance, or the like, is excluded. At the same time, it has been found that toner is hardly deposited on the charging device even in long-term use when the surface of the charging device is coated with a protective layer having a pencil hardness not lower than 6H. Thus, the present invention has been completed on the basis of the aforementioned findings.

That is, the charging device according to the present invention is an electrically conductive member which is pressed against a surface of a body to be charged in a state of application of a voltage to thereby charge the body to be charged, characterized in that the electrically conductive member is formed by laminating at least an electrically conductive elastic body layer, an electrode layer and a resistance regulation layer successively on an electrically conductive support and in that the electrode layer consists of an electrically conductive inorganic material.

Further, the charging device according to the present invention is characterized in that a protective layer having a pencil hardness not lower than 6H is provided on the aforementioned resistance regulation layer.

The present invention will be described below in detail.

When the charging device according to the present invention is used as an charging roll, as shown in FIGS. 1A and 1B, the charging device is constituted by an electrically conductive member comprising: a solid columnar or hollow cylindrical electrically conductive support 1*a*; an electrically conductive elastic body layer 1*b* fixed onto the outer circumferential surface of the electrically conductive support 1*a*; an electrode layer 1*c* with which the elastic body layer 1*b* is coated; and a resistance regulation layer 1*d* with which the whole surface of the electrode layer 1*c* is coated. Further, as shown in FIGS. 1C and 1D, the aforementioned resistance regulation layer 1*d* may be coated with a protective layer 1*e*. A voltage is applied between the electrically conductive support 1*a* of the charging device 1 and a body to be charged (for example, a light-sensitive body 11 shown in FIG. 4).

The electrically conductive support which functions not only as an electrode of the charging device but also as a support member, is formed from an electrically conductive material, for example, a metal or an alloy such as aluminum, a copper alloy, stainless steel, or the like; iron plated with chrome, nickel, or the like; synthetic resin; and so on. The outer diameter of the electrically conductive support is generally set to a value in a range of from 4 mm to 12 mm.

The electrically conductive elastic body layer is provided to set the resistance and hardness of the charging device to predetermined values so that a surface of the body to be charged can be charged uniformly by pressing the charging device against the surface of the body to be charged with a suitable nip width or nip pressure. This elastic body layer is formed by dispersing electrically conductive particles in a rubber material.

Examples of the rubber material include isoprene rubber, chloroprene rubber, epichlorhydrine rubber, butyl rubber, urethane rubber, silicone rubber, fluoro rubber, SBR, NBR, EPDM, acrylonitrile-butadiene-styrene rubber, blended rubber thereof, and so on. Above all, isoprene rubber, silicone rubber and EPDM are used preferably. These rubber materials may be foamed materials or may be unfoamed materials.

As the electrically conductive particles, there can be used fine powder of various kinds of electrically conductive metals or alloys such as carbon black, graphite, aluminum, copper, nickel, stainless steel, etc., fine powder of various kinds of electrically conductive metal oxides such as tin oxide, indium oxide, titanium oxide, tin oxide-antimony oxide solid solution, tin oxide-indium oxide solid solution, etc., insulating material with its surface made electrically conductive, and so on. When, for example, carbon black is used, 3 to 50% by weight of carbon black is arranged with respect to the rubber material in order to obtain a desired value of specific volume resistance.

The thickness of the electrically conductive elastic body layer is selected to be generally in a range of from 2 mm to 6 mm, preferably in a range of from 3 mm to 5 mm. The specific volume resistance of the electrically conductive elastic body layer, which has close relevance to the specific volume resistance of the resistance regulation layer which will be described later, is preferably selected to be in a range of from $10^2$ Ωcm to $10^5$ Ωcm.

The electrode layer is provided to disperse the concentration of electric currents caused by the uneven dispersion of electrically conductive particles in the electrically conductive elastic body layer. The electrode layer consists of an electrically conductive inorganic material.

The same electrically conductive materials as the aforementioned electrically conductive particles are used as the electrically conductive inorganic material and two kinds or more of electrically conductive materials selected from the electrically conductive materials may be used in combination. The specific volume resistance of the electrode layer is selected to be preferably not higher than $10^3$ Ωcm, more preferably not higher than $1.0\times10^2$ Ωcm. If the specific volume resistance is higher than $10^3$ Ωcm, the current flowing toward the body to be charged becomes short so that not only it is impossible to give sufficient electric charge to the body to be charged but also image density irregularity occurs. Particularly when the resistance is not higher than $1.0\times10^2$ Ωcm, there is no occurrence of density irregularity in a halftone image portion.

Incidentally, among the electrically conductive inorganic materials, copper or nickel has a specific volume resistance of about $10^{-6}$ Ωcm, and carbon black has a specific volume resistance slightly lower than $10^2$ Ωcm.

The electrode layer is formed, before or after molding of a rubber material composition for forming a conductive elastic body layer, in a process in which an electrically conductive inorganic material is deposited on the electrically conductive elastic body layer by sprinkling electrically conductive inorganic material powder on the electrically conductive elastic body layer, by spraying electrically conductive inorganic material powder by means of powder coating or by evaporating the inorganic material, and then the inorganic material is made to adhere closely to a surface of the electrically conductive elastic body layer at the same time that the electrically conductive elastic body layer is molded or after the electrically conductive elastic body layer is molded. When, for example, inorganic material powder is sprinkled on the rubber material composition before molding or on the elastic body layer after molding, a layer having a mean particle size in a range of from 1.5 times to 10 times as large as the primary mean particle size is generally formed on the elastic body layer in a state in which the inorganic powder substantially comes into surface contact with each other.

When the electrode layer is formed from electrically conductive inorganic powder in the present invention, respective particles are aggregated by Van der Waals force so as to come into close contact with each other in the form of a multilayer having a uniform layer thickness. On the other hand, when the electrode layer is formed from a vapor deposition film, the electrically conductive inorganic material is precipitated on a surface of the elastic body layer so that a layer is formed by Van der Waals force, interatomic or intermolecular force, and so on. Further, because the electrode layer is formed from the electrically conductive inorganic material exclusively, the specific volume resistance of the electrode layer becomes nearly equal to that of the inorganic material.

When the electrode layer is formed from electrically conductive inorganic material powder, there is generally used inorganic powder having a (primary) mean particle size in a range of from 0.01 μm to 20 μm, for example, inclusive of carbon black having a mean particle size of from 0.01 μm to 0.5 μm, graphite having a mean particle size of from 1 μm to 15 μm and metal, alloy and metal oxide having a mean particle size of from 1 μm to 20 μm. Further, the layer thickness of the electrode layer is in a range of from 5 times to 10 times as large as the mean particle size in the case of carbon black, it is in a range of from 2 times to 5 times as large as the mean particle size in the case of graphite, and it is in a range of from 1.5 times to 5 times as large as the mean particle size in the case of a metal material. Accordingly, preferably, the thickness of the electrode layer is in a range of from 0.05 μm to 30 μm.

If the mean particle size of the electrically conductive inorganic powder is smaller than 0.01 μm, the degree of stratiform arrangement of inorganic powder is reduced so that the resistance of the electrode layer becomes high. If the mean particle size is contrariwise larger than 20 μm, the resistance of the electrode layer also becomes high because it is difficult to form a multilayer and there are some positions where continuous layers are not formed so that the number of contact points is reduced. Furthermore, the degree of biting of a part of inorganic powder into the electrically conductive elastic body layer becomes high undesirably.

The resistance regulation layer is provided to regulate the resistance value of the charging device to a predetermined value and is formed from a thin film obtained by dispersing the aforementioned electrically conductive particles in a resin.

The resin is not limited specifically, but it is preferable to use resins in a category of more or less soft materials such as polyurethane, polyamide, polyester, etc. When, for example, carbon black is used as a material for the electrically conductive particles, 10 to 30% by weight of carbon black is arranged with respect to the resin in order to obtain a desired specific volume resistance.

The specific volume resistance of the resistance regulation layer is preferably selected to be in a range of from $10^5$ Ωcm to $10^9$ Ωcm. The thickness of the resistance regulation layer is preferably selected to be in a range of from 5 μm to 50 μm, more preferably in a range of from 10 μm to 40 μm. If the thickness is smaller than 5 μm, not only it is impossible that the resistance regulation layer fulfills its function but also there is a risk that the surface of the body to be charged is damaged because of a tendency of occurrence of leaking. If the thickness is contrariwise larger than 50 μm, the resistance and hardness of the charging device increase to values larger than those required.

According to the present invention, a protective layer may be formed on the resistance regulation layer. This protective layer functions as a surface layer for preventing the charging device from adhering firmly to the surface of the body to be charged. Furthermore, the protective layer is provided to prevent the charging device from being contaminated by deposition or firm adhesion of toner and its outer additive, paper dust, or the like, remaining on the surface of the body to be charged to thereby prevent the lowering of charging characteristic and the occurrence of image quality failures caused by the lowering of charging characteristic. This protective layer is preferably formed from a silicon type compound shaped like a thin film.

Examples of the silicon type compound include silicon oxide (silica), silicon nitride, carborundum, organic group-substituted or nonsubstituted silicon oxide type/silicon nitride type ceramics, etc. Examples of the organic group include: hydrocarbon residual groups such as methyl group, ethyl group, n-propyl group, i-propyl group, n-butyl group, i-butyl group, t-butyl group, hexyl group, stearyl group, cyclohexyl group, phenyl group, tolyl group, benzyl group, etc.

The protective layer formed from silicon type compound can be formed easily as a protective layer formed from silicon type ceramics by vapor deposition of various kinds of inorganic silicon type compounds or through a process in which the resistance regulation layer is coated with a coating composition containing perhydrosilazane represented by the following chemical formula (in which n is a repetition factor) or containing polysilazane obtained by substituting the aforementioned organic group, and then the resistance regulation layer is heated or burned at a temperature in a range of from 80° C. to 200° C. to decompose the aforementioned polysilazane thermally.

[Chemical Formula 1]

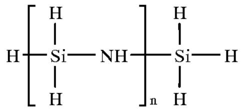

When perhydropolysilazane is heated under an air or oxygen gas atmosphere, silicon oxide type ceramics are produced in the aforementioned thermal decomposing reaction. When perhydropolysilazane is heated under a nitrogen gas atmosphere, silicon nitride type ceramics are produced in the aforementioned thermal decomposing reaction. When organic-group-substituted polysilazane is used, silicon type ceramics denatured by the organic group are produced so that the hardness of the charging device and the hardness of the protective layer can be reduced. Polysilazane in which the percentage of substitution of the organic group is not larger than 30% is used generally, but the present invention is not limited thereto.

The film thickness of the protective layer is preferably in a range of from 0.1 μm to 3.5 μm, more preferably in a range of from 0.3 μm to 3.0 μm. If the film thickness is smaller than 0.1 μm, the function of the protective layer cannot be fulfilled because the protective layer is inferior in durability such as abrasion resistance, or the like. If the film thickness is contrariwise larger than 3.5 $\mu$m, the protective layer has a tendency of occurrence of cracks in the case of an inorganic silicon type compound having no organic group substituted, and irregularity of charging occurs in that case.

The hardness of the protective layer is preferably not lower than 6H as pencil hardness, and the protective layer having such a hardness is formed easily by the aforementioned vapor deposition method or thermal decomposition method.

The hardness of the charging device is selected to be not higher than 70°, preferably in a range of from 40° to 68° in Ascar C. If the hardness is higher than 70°, the nip uniformity between the charging device and the body to be charged is spoiled so that not only image quality failure occurs but also, for example, the surface of the light-sensitive body is abraded gradually in long-term use. The lower the aforementioned hardness is, the more preferable it is. A limit point in production of the charging device is, however, hardness of 30° so long as the electrically conductive elastic body layer does not contain a large amount of softener or plasticizer.

The specific volume resistance of the charging device is preferably in a range of from $10^5$ Ωcm to $10^{10}$ Ωcm. This specific volume resistance can be regulated easily within the aforementioned range by suitably adjusting the aforementioned specific volume resistance of the electrically conductive elastic body layer, and the aforementioned specific volume resistance and film thickness of the resistance regulation layer. If the specific volume resistance is smaller than $10^5$ Ωcm, an overcurrent flows in the surface of the body to be charged so that leaking occurs frequently when a pinhole is present in the surface of the body to be charged. If the specific volume resistance is contrariwise larger than $10^{10}$ Ωcm, it is difficult to charge the body to be charged at a low voltage so that image quality failure occurs because of shortage of charging quantity.

On the other hand, DC and AC superimposed voltages are preferably applied between the charging device and the body to be charged so that the DC voltage is in a range of from 200 to 1500 V and the peak-to-peak AC voltage (Vp-p) is in a range of from 1 kV to 4 kV.

For example, the charging device according to the present invention is produced as follows.

First, a rubber material, electrically conductive particles and suitably added compounding agents such as a softener, a cross-linking agent (inclusive of a vulcanizer and a vulcanization accelerator), an electrically non-conductive filler, etc. are kneaded sufficiently by an open roll, a kneader, or the like, to thereby prepare a rubber composition for forming an elastic body layer. After the aforementioned rubber composition is then molded by an extrusion molding method, an injection molding method, or the like, electrically conductive inorganic material powder is deposited uniformly on a surface of the molding by means of sprinkling, powder spraying, or the like, as described above. Then, the mold in which the electrically conductive support 1*a* is fixed in the center is filled with the molding having inorganic powder deposited thereon.

Then, though the method varies depending on the kind of the rubber material and the kind of the material mixed therein, the rubber molding in the mold is heated at a temperature in a range of from 100° C. to 200° C. for a period of time in a range of from 5 to 90 minutes, and further heated to a temperature in a range of from 150° C. to 230° C. by a compression molding method, a transfer molding method, or the like, to thereby perform secondary vulcanization. Thus, the elastic body layer 1*b* containing electrically conductive particles and the electrode layer 1*c* consisting an inorganic material are molded simultaneously on the outer circumference of the support 1*a* so that the elastic body layer 1*b* is coated with the electrode layer 1*c* having a uniform layer thickness.

When the electrically conductive elastic body layer 1*b* is formed from a foamed material, a foaming agent is mixed in the aforementioned rubber composition or an inert gas is mixed in the aforementioned rubber composition by a gas mixing method in advance so that a foamed elastic body layer 1*b* and a electrode layer 1*c* can be formed simultaneously by a compression molding method or the like. Examples of the foaming agent include: azo type compounds such as azodicarbonamide, α,α'-azobisisobutyronitrile, diazoaminobenzene, etc.; sulfohydrazide type compounds such as benzene sulfonylhydrazide, p-toluene sulfonylhydrazide, etc.; nitroso type compounds such as dinitrosopentamethylene tetramine, etc.; and so on. As the inert gas, nitrogen gas, carbon dioxide gas, or the like, is used.

Then, a resin component, electrically conductive particles and additives to be suitably blended are added to an organic solvent and mixed sufficiently to thereby prepare a coating composition for forming a resistance regulation layer. Then, the aforementioned coating composition is applied onto the surface of the aforementioned electrode layer 1*c* by a suitable coating method such as a dip coating method, an air spraying method, or the like, and then dried at the ordinary temperature or dried while heated to thereby form a resistance regulation layer 1*d*. Thus, the charging device 1 according to the present invention is produced.

Further, when a protective layer 1*e* is to be provided, the protective layer 1*e* can be formed on the resistance regulation layer 1*d* by a vapor deposition method, a thermal decomposition method, or the like, as described above. Further, the electrode layer 1*c* may be formed directly on the elastic body layer 1*b* by vapor deposition, or the like.

Although the roll-shaped charging device (charging roll) has been described above, the charging device according to the present invention may be shaped like a block or a blade. With respect to the direction of the thickness as shown in FIG. 2, in the block-shaped or blade-shaped charging device, an electrically conductive elastic body layer 2*b* or 3*b* is stuck/fixed to a plate-like electrically conductive support 2*a* or 3*a* in a side opposite to a body to be charged on which a charging device 2 or 3 is disposed under pressure, and a electrode layer 2*c* or 3*c* and a resistance regulation layer 2*d* or 3*d* are laminated on the elastic body layer 2*b* or 3*b* successively. Further, a protective layer is laminated on the resistance regulation layer 2*d*, 3*d*, if necessary.

The charging device according to the present invention can be applied not only to the charger but also to a copying machine, a destaticizer, or the like. When used as a charging device in a copying machine, the charging device is pressed against a body to be charged such as a light-sensitive body, or the like, through a transfer material such as a sheet, or the like, and the specific volume resistance of the charging device is adjusted to be within a range of from $10^7$ Ωcm to $10^{10}$ Ωcm. When used as a charging device in a destaticizer, the charging device directly touches a body to be charged, and the specific volume resistance of the charging device is adjusted in a range of from $10^2$ Ωcm to $10^4$ Ωcm.

Operation of the Invention

In the charging devices 1 to 3 according to the present invention, electrically conductive elastic body layers 1*b* to 3*b*, electrode layers 1*c* to 3*c* consisting of an electrically conductive inorganic material and resistance regulation layers 1*d* to 3*d* are laminated successively on electrically conductive supports 1*a* to 3*a*.

Accordingly, because a current flows toward a nip portion between the elastic body layer and the body to be charged through the electrode layer having low resistance even in the case where the current hardly flows in the elastic body layer, sufficient electric charge can be given to the body to be charged. Further, because the electrode layer to attain dispersion of voltage consists of an electrically conductive inorganic material containing no resin and no rubber material, the voltage in the longitudinal direction of the electrode layer becomes uniform so that there is no occurrence of leaking. Furthermore, the density irregularity in a halftone image portion is reduced to a substantially ignorable level. Particularly in the case where the specific volume resistance of the electrode layer is not larger than $1.0\times10^{2}$ Ωcm, there is no occurrence of image density irregularity also in a halftone image portion because there is no occurrence of charging irregularity caused by the electric resistance irregularity of the elastic body layer.

On the other hand, in the charging device in which a protective layer having a pencil hardness not lower than 6H is laminated on its surface, the charging device is not contaminated with toner and its outer additive, or the like, even in the case where the charging device is used for a long time because the hardness of the protective layer is high. Accordingly, there is no lowering of charging characteristic for a long time, so that the charging device is excellent in durability.

BRIEF DESCRIPTION OF THE DRAWINGS

FIG. 1A is a perspective view of a three-layer structure charging device;

FIG. 1B is a sectional view thereof;

FIG. 1C is a perspective view of a four-layer structure charging device in which a protective layer is provided in the surface; and FIG. 1D is a sectional view thereof.

DETAILED DESCRIPTION OF THE PREFERRED EMBODIMENTS

The present invention will be described below specifically on the basis of embodiments thereof, but the invention is not limited to the following embodiments.

Image Forming Apparatus

Figure 1A:
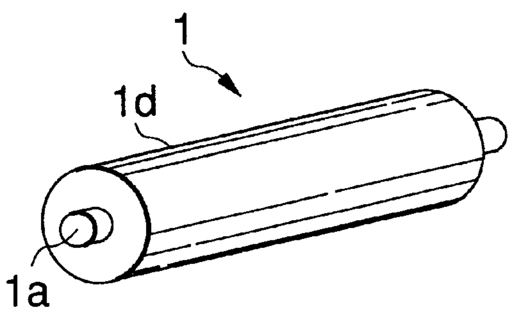
FIGS. 1A to 1D are explanatory views of charging devices having different layer structures showing examples of the present invention.
Figure 1B:
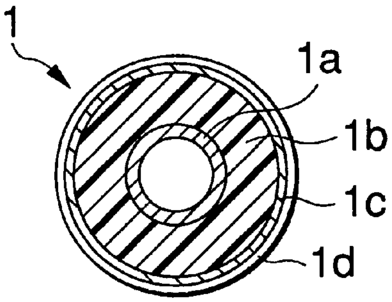
Figure 1C:
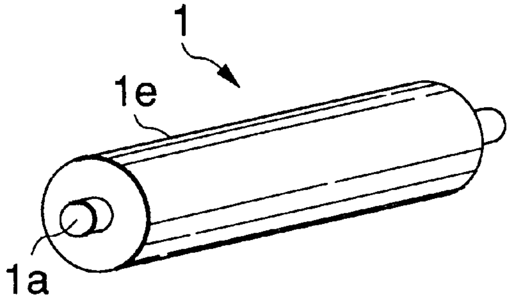
Figure 1D:
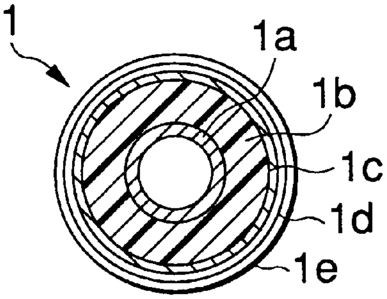
Figure 2A:
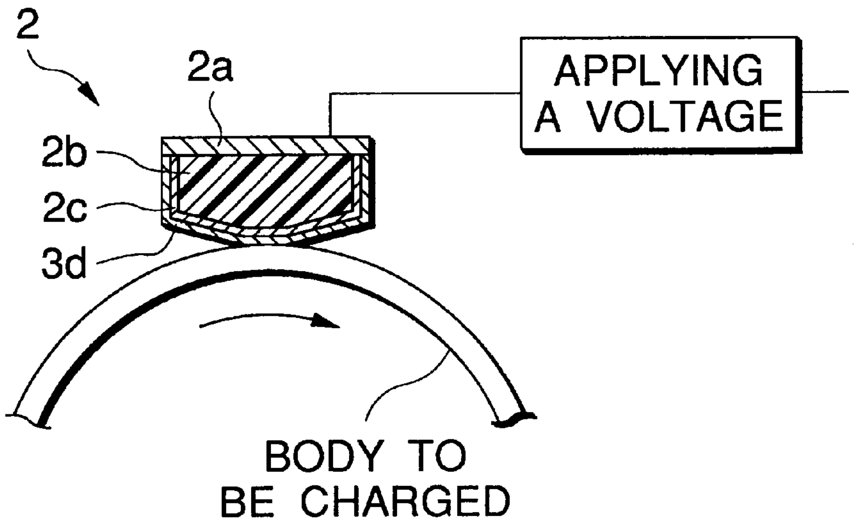
FIGS. 2A and 2B are views for explaining the charging device as another embodiment of the present invention, and are sectional views of different charging devices respectively.
Figure 2B:
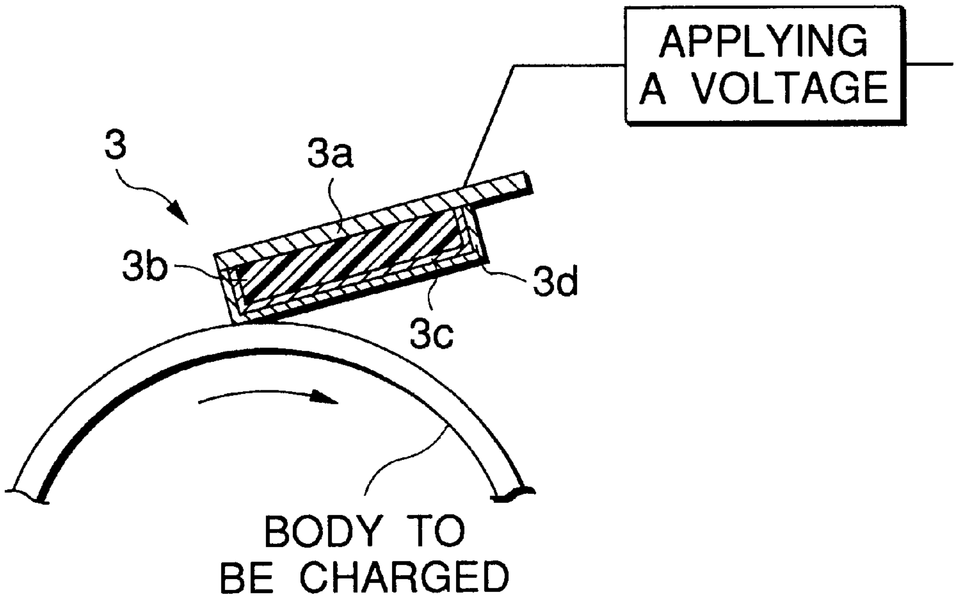
Figure 3:
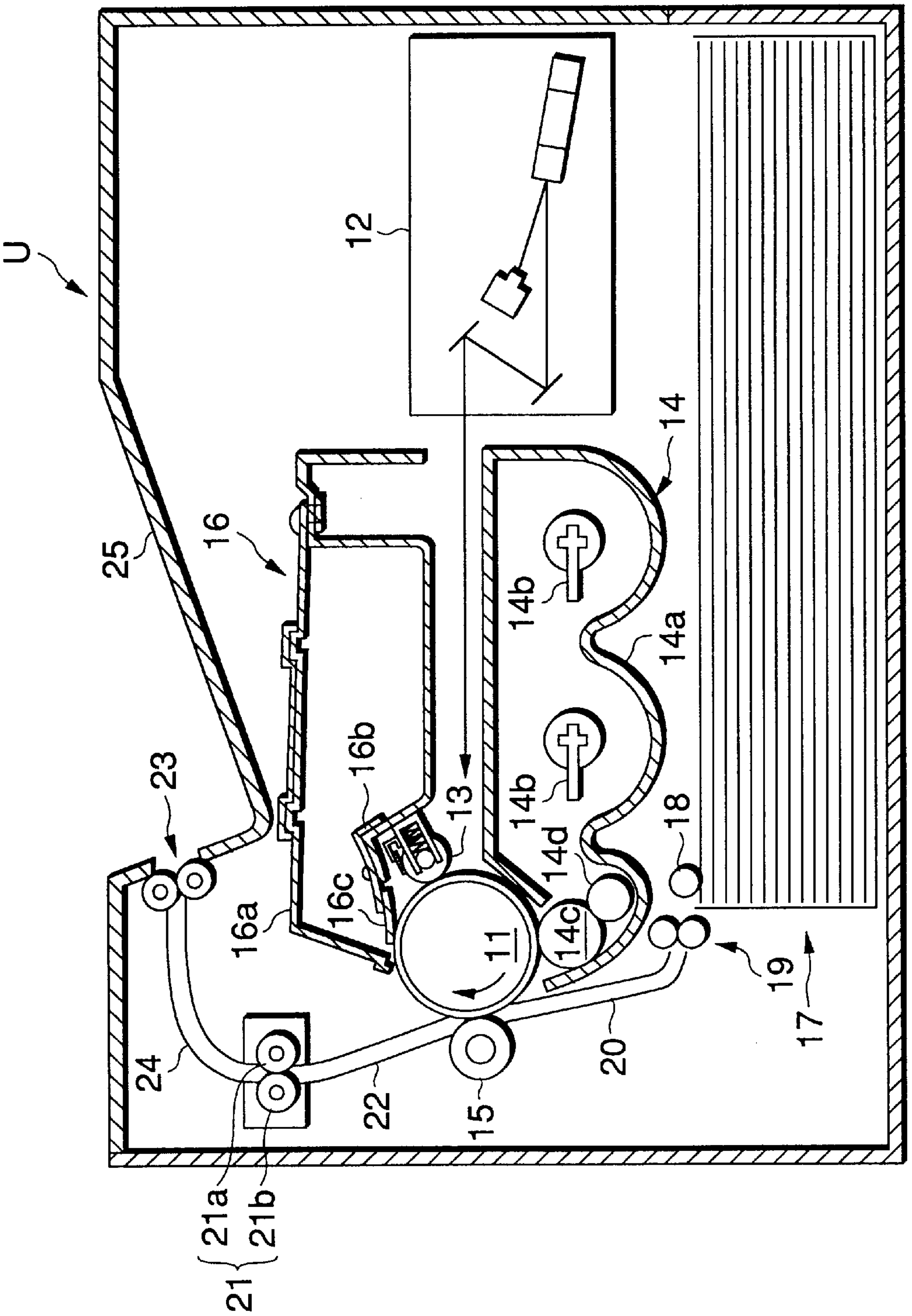
FIG. 3 is a view for explaining the whole of an image forming apparatus including the charging device according to the present invention.

FIG. 3 is a view for explaining the whole of an image forming apparatus containing a roll-shaped charging device according to the present invention as shown in FIG. 1, and a vertical sectional view taken in the left and right directions in the center portion.

In FIG. 3, a cylindrical light-sensitive body (drum) 11 rotating in the direction of the arrow is disposed in the inside of a body of the image forming apparatus U so as to serve as an electrostatic latent image carrier. A laser writer 12 for writing an electrostatic latent image in the surface of the light-sensitive body 11 is disposed in one side of the inside of the body of the image forming apparatus U. A charger 13 for charging a surface of the light-sensitive body 11 uniformly, a developer 14 for developing the aforementioned electrostatic latent image, a transfer machine 15 for transferring the developed toner image to a sheet of paper (transfer material) and a cleaner 16 for removing remaining toner on the light-sensitive body 11 are disposed successively along the direction of the rotation of the cylindrical light-sensitive body 11 in the periphery of the cylindrical light-sensitive body 11.

The developer 14 has a vessel 14*a* for receiving toner. Stirring members 14*b*, 14*b* for stirring toner, a rotatable developing agent carrier 14*c* and a toner supply roller 14*d* for supplying toner to the carrier 14*c* are provided in the inside of the vessel 14*a*. The developing agent carrier 14*c* faces to an opening portion of the vessel 14*a* and is supported by the vessel 14*a* through a slight gap between the developing agent carrier 14*c* and the surface of the light-sensitive body 11. The aforementioned cleaner 16 has a casing 16*a*. A metal blade holder 16*b* is fixed to this casing 16*a*, and a sheet-like cleaning blade 16*c* is firmly stuck to an end portion of the blade holder 16*b*. An edge portion which is an end portion of the cleaning blade 16*c* abuts on the surface of the light-sensitive body 11.

A paper supply tray 17 for receiving paper is disposed in the lower portion of the body of the image forming apparatus U. A paper takeout roller 18 for taking out sheets of paper one by one from the paper supply tray 17 is disposed in an end portion of the upper surface of the paper supply tray 17. A pair of paper guides 20 for guiding a sheet of paper to be carried by a pair of paper carrying rollers 19 are disposed in the side upper portion of the paper takeout roller 18.

A fixer 21 having a heating roller 21*a* and a pressing roller 21*b* is disposed in the upper portion of the opposite side portion in the inside of the body of the image forming apparatus U. A carry path 22 for carrying the sheet of paper having a toner image transferred is disposed between the fixer 21 and the transferrer 15. Further, a pair of exhaust rollers 23 and a carry path 24 for guiding the sheet of paper having the fixed toner image from the fixer 21 to the exhaust rollers 23 are provided above the fixer 21. Further, an exhaust tray 25 on which paper discharged from the exhaust rollers 23 is put, is formed in the upper surface of the body of the image forming apparatus U.

Charger

Figure 4:
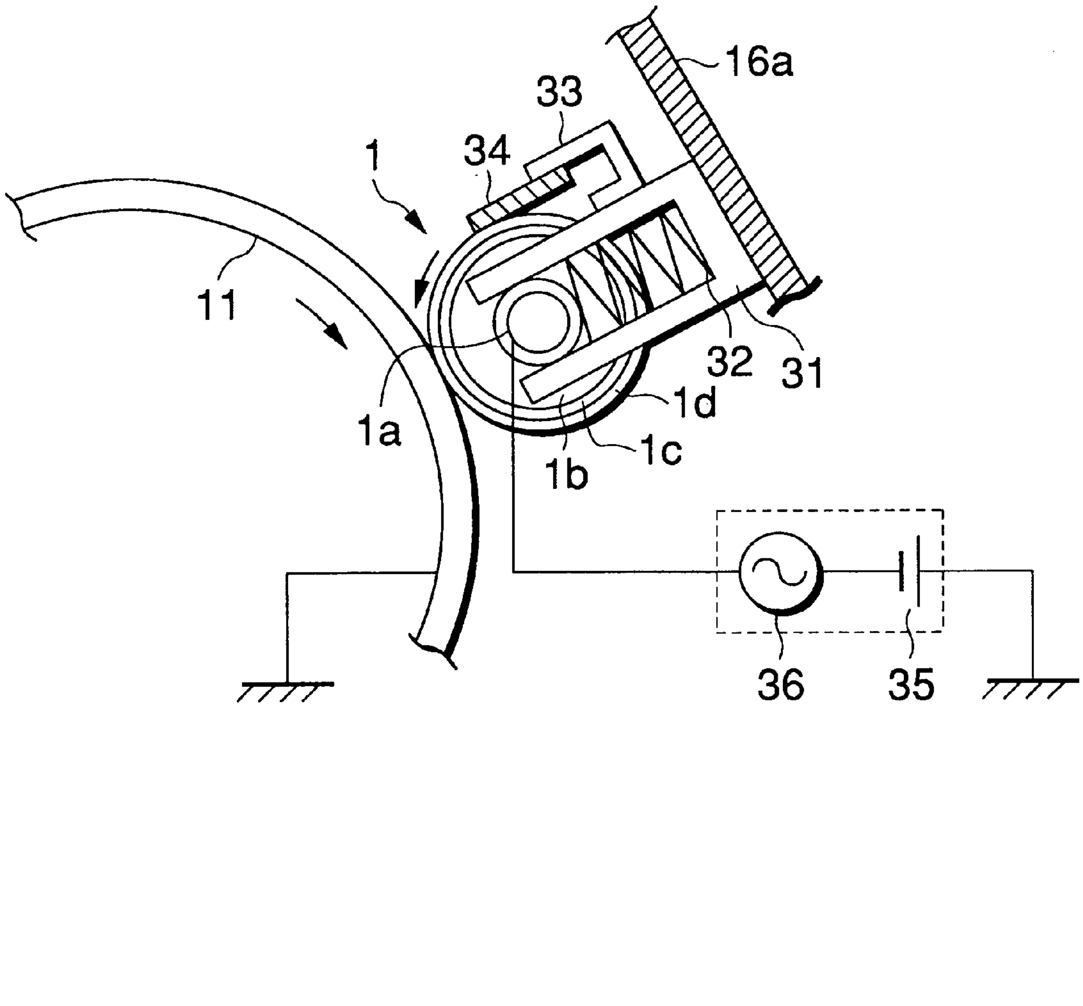
FIG. 4 is an enlarged view of main part of FIG. 3 showing the structure of a charger.

FIG. 4 is an enlarged view of main part of FIG. 3 showing the structure of the aforementioned charger.

In FIG. 4, the charger 13 has a roll-shaped charging device 1 as described above. The charging device 1 is designed so that opposite end portions of the electrically conductive support 1*a* thereof are supported by a support member 31 fixed to the casing 16*a* of the cleaner 16. Further, the charging device 1 is pressed against a surface of a light-sensitive body 11 so as to be brought into contact with the light-sensitive body 11 by the urging force of two pressing springs 32 each having one end fixed to the support member 31 and an opposite end fixed to an end portion of the support 1*a*. A pad holder 33 of a metal is fixed to the support member 31 so that even in the case where a very small quantity of toner is deposited on the surface of the charging device 1, the toner is removed by a sheet-like cleaning pad 34 firmly fixed to an end portion of the pad holder 33.

Further, superimposed vibration voltages from a DC electric source 35 and an AC electric source 36 connected in series are applied to the support 1*a* of the charging device 1. Accordingly, the charging device 1 can perform charging of the surface of the light-sensitive body 11 uniformly rotating in a predetermined direction while touching the surface of the resistance regulation layer 1*d*, by means of the electrically conductive elastic body layer 1*b*, the electrode layer 1*c* and the resistance regulation layer 1*d* through the support 1*a*.

The operation of the image forming apparatus U in the present invention is the same as that of the conventional apparatus and the brief description thereof is as follows.

As described above, the surface of the light-sensitive body 11 rotating in the direction of the arrow is charged uniformly by the charging device 1 to which superimposed vibration voltages are applied. An electrostatic latent image is written into the thus uniformly charged light-sensitive body 11 by the laser writer 12. The electrostatic latent image on the light-sensitive body 11 is developed to a toner image by the developer 14. The toner image is transferred to a sheet of paper carried from the paper supply tray 17 by the transferrer 15. After the transferred toner image is fixed by the fixer 21, the sheet of paper is discharged onto the exhaust tray 25 by the exhaust rollers 23. Further, after the toner image is transferred to the sheet of paper, toner remaining on the surface of the light-sensitive body 11 is removed by the blade 16*c* of the cleaner in order to make a preparation for the next electrophotographic process.

Embodiment 1

Electrically conductive silicone rubber (DY32-5048U: made by Toray-Dow Corning K.K.) containing α,α'-azobisisobutyronitrile as a foaming agent was kneaded sufficiently in an open roll. The kneaded rubber mixture thus obtained was molded by an extrusion molding method, and the aforementioned rubber molding was rolled on graphite fine powder (mean particle size: 7 μm), of specific volume resistance 0.6 Ωcm, which was spread to be thin, so that graphite was sprinkled uniformly on the surface of the non-vulcanized silicone rubber molding.

Then, a cavity of a compression molding apparatus with an inner diameter of 16 mm in which an SUS support 1*a* processed by prime coating in advance and having an outer diameter of 8 mm was inserted/supported concentrically in the center of a mold, was filed with the silicone rubber molding having a surface on which graphite was deposited. Then, foaming was performed by heating at 180° C. for an hour, and the foamed body thus obtained was further heated at 200° C. for 4 hours so as to be secondarily vulcanized. Thus, a roll molding in which the 4 mm-thick electrically conductive elastic body layer 1*b* coated with the graphite electrode layer 1*c* was stick to the outer circumference of the support 1*a* was obtained.

When the aforementioned electrode layer 1*c* was observed by an electron microscope, it was found that a small part of graphite bit the elastic body layer 1*b*, but a close and uniform graphite layer was formed with a thickness of 20 μm.

Then, the following components were mixed in a ball mill to thereby prepare a dispersion in which carbon black was uniformly dispersed in a resin solution. The thus prepared dispersion was applied onto the aforementioned electrode layer 1*c* by spraying, heated and dried to thereby form a resistance regulation layer 1*d* having a film thickness of 20 μm and formed from a polyurethane film.

| | |
|---|---|
| Single liquid type urethane resin (DF-407: DAINIPPON INK & CHEMICALS, INC.) | 100 parts by weight |
| Carbon black (Regal 660R: made by Cabot) | 5 parts by weight |
| 2-butanone | 100 parts by weight |

The hardness of the charging device 1 produced as described above was 40°, and the pencil hardness of the carbon black-containing polyurethane film was 3B.

Embodiment 2

A resistance regulation layer 1*d* was formed in the same manner as in Embodiment 1, except that graphite fine powder having a specific volume resistance of 0.3 Ωcm was used as the electrically conductive inorganic material.

Then, a roll having a resistance regulation layer 1*d* formed thereon was immersed in a 20% xylene solution of perhydropolysilazane (Tonen Polysilazane; made Tonen Corp.) having a weight-averaged molecular weight of 4000 to 5000, and then burned at 150° C. to thereby form a protective layer 1*e* formed from an amorphous silica film and having a film thickness of 1 μm. The hardness of the charging device 1 thus produced was 51°, and the pencil hardness of the amorphous silica film was 9H.

Embodiment 3

A roll molding in which an electrically conductive elastic body layer 1*b* coated with a carbon black electrode layer 1*c* was stick to the outer circumference of a support 1*a* was obtained in the same manner as in Embodiment 1, except that carbon black fine powder (mean particle size: 0.1 μm) having a specific volume resistance of 80 Ωcm was used as the electrically conductive inorganic material. The thickness of the aforementioned electrode layer 1*c* was 0.7 μm.

Then, Tin oxide was added to a resin solution obtained by stirring polyamide resin and methanol. The components were mixed in a ball mill to thereby prepare a dispersion containing the following components. The dispersion thus obtained was applied onto the electrode layer 1*c* by spraying, heated and dried to thereby form a resistance regulation layer 1*d* formed from a tin oxide-containing polyamide resin and having a film thickness of 30 μm.

| | |
|---|---|
| Polyamide resin (CM8000: made by Toray Industries Inc.) | 100 parts by weight |
| Fine powder-like tin oxide (Pastran: made by Mitsui Mining & Smelting Co., Ltd.) | 600 parts by weight |
| Methanol | 300 parts by weight |

Further, the roll having the resistance regulation layer 1*d* formed was immersed for coating and burned in the same manner as in Embodiment 2 to thereby form a protective layer 1*e* formed from an amorphous silica film and having a film thickness of 3 μm. The hardness of the charging device (1) thus produced was 65°, and the pencil hardness of the amorphous silica film was 9H.

Embodiment 4

A resistance regulation layer 1*d* was formed in the same manner as in Embodiment 1, except that graphite fine powder having a specific volume resistance of 0.02 Ωcm was used as the electrically conductive inorganic material.

The, the roll having the resistance regulation layer 1*d* formed was immersed in a 20% xylene solution of perhydropolysilazane. Then, the roll was burned in a nitrogen current at 150° C. to thereby form a protective layer 1*e* formed from an amorphous silicon nitride film and having a film thickness of 0.5 μm. The hardness of the charging device 1 thus produced was 55°, and the pencil hardness of the amorphous silicon nitride film was 9H.

Embodiment 5

A roll molding in which an electrically conductive elastic body layer 1*b* coated with a carbon black electrode layer 1*c* was stick to the outer circumference of a support 1*a* was obtained in the same manner as in Embodiment 3.

The, the roll having the resistance regulation layer 1*d* formed on the electrode layer 1*c* in the same manner as Embodiment 1, was immersed in a 20% Xylene solution of 10%-methylated perhydropolysilazane (Tonen polysilazane: made by Tonen Inc.). Then, the roll was burned at 150° C. to thereby form a protective layer 1*e* formed from a methyl group-denatured amorphous silica film and having a film thickness of 1 μm. The hardness of the charging device 1 thus produced was 45°, and the pencil hardness of the methyl group-denatured amorphous silica film was 6H.

Embodiment 6

The roll of Embodiment 1 having the resistance regulation layer 1*d* formed was immersed in a 20% xylene solution of 10%-phenylated perhydropolysilazane (Tonen polysilazane: made by Toner Inc.). Then, the roll was burned at 150° C. to thereby form a protective layer 1*e* formed from a phenyl group-denatured amorphous silica film and having a film thickness of 2 μm. The hardness of the charging device 1 thus produced was 45°, and the pencil hardness of the amorphous silica film was 6H.

Embodiment 7

A charging device was produced in the same manner as in Embodiment 2, except that graphite fine powder having a specific volume resistance of $5\times10^2$ Ωcm was used as the electrically conductive inorganic material. The hardness of the charging device 1 was 51°.

Embodiment 8

A charging device was produced in the same manner as in Embodiment 3, except that an electrode-layer 1*c* was formed by using graphite fine powder having a specific volume resistance of $5\times10^2$ Ωcm as the electrically conductive inorganic material and that no protective layer 1*e* was formed. The hardness of the charging device 1 was 50°, and the pencil hardness of the resistance regulation layer 1*d* was 2B.

Comparative Example

A roll was produced in the same manner as in Embodiment 3, except that neither electrode layer 1*c* nor protective layer 1*e* was formed. That is, the charging device in the Comparative Example was composed of an electrically conductive silicone rubber foamed elastic body layer 1*b* on the outer circumference of a support 1*a*, and a resistance regulation layer 1*d* provided on the elastic body layer 1*b* and formed from a polyamide resin film. The hardness of the charging device was 50°.

Image Evaluation Test

The charging device produced as described above was attached to a charger 13 in an image forming apparatus (Able 3221: made by Fuji Xerox Co., Ltd.).

Superimposed vibration voltages from a DC electric source 35 and an AC electric source 36 connected in series were applied to the support 1*a* of the charging device so that a surface of the light-sensitive body 11 having an outer diameter of 30 mm and brought into contact with the charging device 1 was charged to −420 V uniformly. The aforementioned superimposed vibration voltage was composed of a DC component of −420 V, and an AC component having a-peak-to-peak voltage of 1.5 kV. Further, in a process after charging, an image was formed on a sheet of paper according to the ordinary method.

A printing durability test was performed by operating the aforementioned image forming apparatus. As a result, in the charging device in each of Embodiments, there was no occurrence of image quality failures caused by charging irregularity, so that a sharp image was obtained. Furthermore, in each of Embodiments 1 to 6 in which an electrode layer having a specific volume resistance not larger than $1.0\times10^2$ Ωcm was provided, there was no occurrence of density irregularity in a halftone image portion. Further, in Embodiment 7 or 8 in which an electrode layer having a specific volume resistance of $5.0\times10^2$ cm was provided, density irregularity occurred slightly in a halftone image portion, but there was no problem in practical use. Further, in each of Embodiments 2 to 7 in which a protective layer having a pencil hardness not lower than 6H was provided in the surface, there was no occurrence of image quality deterioration caused by the contamination of the charging device even after 200,000 copies were formed.

On the contrary, in Comparative Example in which no electrode layer was provided, density irregularity occurred in a halftone image portion initially.

In the charging device according to the present invention, because the electrode layer to attain dispersion of voltage consists of an electrically conductive inorganic material, the voltage in the longitudinal direction of the electrode layer becomes uniform so that there is no occurrence of leaking. Furthermore, a good-quality image is obtained in such a level that density irregularity in a halftone image portion can be ignored in practical use. Particularly in the case where the specific volume resistance of the electrode layer is selected to be not larger than $1.0\times10^2$ Ωcm, there is no occurrence of density irregularity in the halftone image portion.

Further, in the charging device according to the present invention in which a protective layer having a pencil hardness not lower than 6H is provided in the surface, the hardness of the protective layer is so high that lowering of charging characteristic for a long time is prevented and that the charging device is excellent in durability.

What is claimed is:

1. A process for preparing a charging device which is pressed against a surface of a body to be charged in a state that a voltage is applied to charge said body, comprising:

kneading an electrically conductive elastic material;

molding said kneaded electrically conductive elastic material;

rolling said electrically conductive elastic material on an electrically conductive inorganic powder to deposit the powder on the elastic material;

placing the powered elastic material into a molding apparatus and heating said powdered elastic material to form an electrically conductive elastic body layer with an electrode layer thereon;

affixing said electrically conductive elastic body layer, with an electrode layer thereon, to an outer circumference of an electrically conductive support to which a voltage is applied; and providing a resistance regulation layer for regulating resistance on said electrode layer.

2. The process according to claim 1, wherein said electrically conductive elastic material is silicone rubber.

3. The process according to claim 1, wherein the electrically conductive inorganic powder is graphite.

4. The process according to claim 3, wherein the mean particle size of graphite is about 7 μm.

5. A process according to claim 3, wherein the specific volume resistance of graphite is about 0.6 μm.

6. The process according to claim 1, wherein said electrically conductive elastic material is uniformly rolled on said electrically conductive inorganic powder.

7. The process according to claim 1, wherein said powdered elastic material is heated at 180° C. for 1 hour.

* * * * *